US009114557B2

(12) United States Patent
Sasaki et al.

(10) Patent No.: US 9,114,557 B2
(45) Date of Patent: Aug. 25, 2015

(54) DIFFUSION SHEET, BACKLIGHT, LIQUID CRYSTAL DISPLAY APPARATUS AND METHOD OF MANUFACTURING THE DIFFUSION SHEET COMPRISING A PLURALITY OF CONVEX SHAPES THAT ARE IRREGULARLY SPACED AND ALIGNED RELATIVE TO EACH OTHER

(75) Inventors: Jun Sasaki, Miyagi (JP); Akihiro Horii, Miyagi (JP); Naoto Sugawara, Miyagi (JP); Kanako Hashimoto, Miyagi (JP); Takeshi Kondou, Miyagi (JP); Makoto Aoki, Miyagi (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 13/045,726

(22) Filed: Mar. 11, 2011

(65) Prior Publication Data
US 2012/0062820 A1   Mar. 15, 2012

(30) Foreign Application Priority Data

Mar. 17, 2010   (JP) ................. P2010-060395

(51) Int. Cl.
*G02F 1/1335*   (2006.01)
*B29C 33/42*   (2006.01)
*G02B 5/02*   (2006.01)
*B29C 59/04*   (2006.01)

(52) U.S. Cl.
CPC .............. *B29C 33/42* (2013.01); *G02B 5/0221* (2013.01); *G02B 5/0268* (2013.01); *G02B 5/0278* (2013.01); *G02B 5/0284* (2013.01); *B29C 59/04* (2013.01); *G02F 1/133606* (2013.01); *Y10T 428/24355* (2015.01)

(58) Field of Classification Search
CPC ....... G02B 5/0268; B29C 59/04; B29C 33/42
USPC ....................................... 349/62–65
See application file for complete search history.

(56) References Cited

U.S. PATENT DOCUMENTS

| 2003/0147140 | A1* | 8/2003 | Ito .................. 359/599 |
| 2008/0123019 | A1* | 5/2008 | Oku et al. .......... 349/64 |
| 2009/0225533 | A1* | 9/2009 | Yamagishi et al. .......... 362/97.2 |
| 2010/0110331 | A1* | 5/2010 | Han et al. ............. 349/62 |

FOREIGN PATENT DOCUMENTS

| CN | 1854846 | 11/2006 |
| CN | 101017217 | 8/2007 |
| JP | 2006-318668 | 11/2006 |

(Continued)

OTHER PUBLICATIONS

Chinese Office Action issued Feb. 7, 2014 in corresponding Chinese Patent Application No. 201110058310.5.

(Continued)

*Primary Examiner* — Paul Lee
(74) *Attorney, Agent, or Firm* — K&L Gates LLP

(57) ABSTRACT

A diffusion sheet includes a light-transmissive base member, a plurality of structures, and a flattened portion. The light-transmissive base member has a first main surface and a second main surface. The plurality of structures have convex shapes, which are randomly formed on the first main surface. The flattened portion is formed among the plurality of structures on the first main surface and has a surface roughness (Ra) equal to or lower than 0.6 μm.

3 Claims, 16 Drawing Sheets

(56) References Cited

FOREIGN PATENT DOCUMENTS

| | | |
|---|---|---|
| JP | 2008-218321 | 9/2008 |
| JP | 2009-211924 | 9/2009 |
| JP | 2009-223192 | 10/2009 |
| WO | 2008069324 | 6/2008 |
| WO | 2009/028769 | 3/2009 |

OTHER PUBLICATIONS

Japanese Office Action issued Jan. 7, 2014 in corresponding Japanese Patent Application No. 2010-060395.

Chinese Office Action issued on Sep. 18, 2014 in corresponding Chinese Application No. 201110058310.5.

\* cited by examiner

DIFFUSION SHEET, BACKLIGHT, LIQUID CRYSTAL DISPLAY APPARATUS AND METHOD OF MANUFACTURING THE DIFFUSION SHEET COMPRISING A PLURALITY OF CONVEX SHAPES THAT ARE IRREGULARLY SPACED AND ALIGNED RELATIVE TO EACH OTHER

CROSS REFERENCES TO RELATED APPLICATIONS

The present application claims priority to Japanese Priority Patent Application JP 2010-060395 filed in the Japan Patent Office on Mar. 17, 2010, the entire content of which is hereby incorporated by reference.

BACKGROUND

The present invention relates to a diffusion sheet on which structures having convex shapes are formed on a surface thereof, a method of manufacturing the diffusion sheet, a backlight including the diffusion sheet, and a liquid crystal display apparatus.

Various types of optical sheets have been used for a backlight which is incorporated into a liquid crystal display apparatus in the past. There is exemplified a diffusion sheet as one of the most important sheets among various types of optical sheets. A diffusion sheet in which a convex-form microlens group is formed on a main surface of a transparent sheet base member has been known (for example, see Japanese Patent Application Laid-open No. 2006-318668).

SUMMARY

A diffusion sheet is further desired to be made thinner because a liquid crystal display apparatus has been progressively made thinner in recent years. A diffusion sheet is arranged between a light source and a liquid crystal panel and has a function of diffusing light output from the light source so as to eliminate unevenness in brightness or bright point. That is to say, as a diffusion sheet has a higher haze, a light diffusing function of the diffusion sheet becomes higher. In contrast, as a diffusion sheet has a higher haze, brightness of a liquid crystal panel in the frontal direction becomes lower.

In view of the above circumstances, it is desirable to provide a diffusion sheet capable of improving a light diffusing function while suppressing lowering of brightness in the frontal direction, a backlight including the diffusion sheet, a liquid crystal display apparatus, and a method of manufacturing a diffusion sheet.

According to an embodiment, there is provided a diffusion sheet including a light-transmissive base member, a plurality of structures, and a flattened portion.

The light-transmissive base member has a first main surface and a second main surface.

The plurality of structures have convex shapes, which are randomly formed on the first main surface.

The flattened portion is formed among the plurality of structures on the first main surface and has a surface roughness (Ra) equal to or lower than 0.6 µm.

In the above diffusion sheet, the structures have functions of diffusing and collecting light transmitted through the light-transmissive base member. Since the structures are randomly formed on the first main surface, moire can be suppressed from being generated. Further, the flattened portion formed among the structures on the first main surface has a surface roughness (Ra: arithmetic mean roughness) equal to or lower than 0.6 µm. Therefore, the flattened portion has a light diffusing function. Accordingly, with the above diffusion sheet, a light diffusing function can be improved while suppressing lowering of brightness in the frontal direction.

The flattened portion has a surface roughness (Ra) equal to or larger than 0.2 µm and equal to or lower than 0.6 µm. If the surface roughness of the flattened portion is lower than 0.2 µm, an increase rate of the haze of the diffusion sheet is small. Further, if the surface roughness of the flattened portion is larger than 0.6 µm, although the increase rate of the haze of the diffusion sheet becomes larger, a decrease rate of the front brightness also becomes larger. The haze can be increased while suppressing considerable lowering of the front brightness by setting the surface roughness of the flattened portion to be in the above range. When the roughness of the flattened portion has directional property, it is sufficient that roughness in at least one direction is equal to or lower than 0.6 µm.

The second main surface may have a surface roughness (Ra) equal to or lower than 0.5 µm. Therefore, the haze of the diffusion sheet can be increased. Further, friction of the second main surface is lowered so as to prevent the second main surface from being damaged.

According to an embodiment, there is provided a backlight including a diffusion sheet and a light source.

The diffusion sheet includes a light-transmissive base member, a plurality of structures, and a flattened portion. The light-transmissive base member has a first main surface and a second main surface. The plurality of structures have convex shapes, which are randomly formed on the first main surface. The flattened portion is formed among the plurality of structures on the first main surface and has a surface roughness (Ra) equal to or lower than 0.6 µm.

The light source is arranged on a side of the second main surface.

According to an embodiment, there is provided a liquid crystal display apparatus including a diffusion sheet, a light source, and a liquid crystal panel.

The diffusion sheet includes a light-transmissive base member, a plurality of structures, and a flattened portion. The light-transmissive base member has a first main surface and a second main surface. The plurality of structures have convex shapes, which are randomly formed on the first main surface. The flattened portion is formed among the plurality of structures on the first main surface and has a surface roughness (Ra) equal to or lower than 0.6 µm.

The light source is arranged on a side of the second main surface.

The liquid crystal panel is arranged on a side of the first main surface.

In the above backlight and liquid crystal display apparatus, the diffusion sheet has a light diffusing function and a light collecting function. Since the structures are randomly formed on the first main surface, the generation of moire can be suppressed. Further, the flattened portion formed among the structures on the first main surface has a surface roughness (Ra: arithmetic mean roughness) equal to or lower than 0.6 µm. Therefore, the flattened portion has a light diffusing function. Accordingly, a light diffusing function can be improved while suppressing lowering of brightness in the frontal direction.

According to an embodiment, there is provided a method of manufacturing a diffusion sheet, the method including forming a random exposure pattern on a resist layer formed on a surface of a master plate production base member.

Openings with a random pattern are formed on the resist layer by developing the resist layer on which the random exposure pattern is formed.

A master plate having recesses formed to correspond to the openings and a flattened portion covered by the resist layer is produced by etching the master plate production base member using the resist layer on which the openings are formed as a mask.

The flattened portion is roughened to have a surface roughness (Ra) equal to or lower than 0.6 μm.

Shapes of the recesses and the roughened flattened portion of the master plate are transferred onto a main surface of a light-transmissive base member to produce a diffusion sheet having a plurality of structures having convex shapes and a roughened flattened portion which is arranged among the plurality of structures.

With the above method of manufacturing a diffusion sheet, a diffusion sheet in which structures having a light diffusing function and a light collecting function and a flattened portion having a light diffusing function are formed on a main surface thereof is manufactured. Therefore, a light diffusing function can be improved while suppressing lowering of brightness in the frontal direction.

The roughening the flattened portion includes blast processing in which the flattened portion is irradiated with blast particles. Further, the flattened portion of the master plate may be roughened by employing other surface processing methods including laser processing, wire brushing processing, and grinding processing of a surface of the master plate.

In the blast processing, inner surfaces of the recesses are prevented from being roughened by using blast particles each having a particle diameter larger than an opening diameter of each of the recesses. Accordingly, surface smoothness of the structures of the diffusion sheet can be kept and lowering of the front brightness can be suppressed.

As described above, according to the embodiments of the present invention, a diffusion sheet which is capable of improving a light diffusing function while suppressing lowering of brightness in the frontal direction can be provided. Further, a backlight or a liquid crystal display apparatus of which unevenness in brightness is reduced and front brightness is increased can be provided by incorporating the diffusion sheet in the backlight or the liquid crystal display apparatus.

These and other objects, features and advantages of the present invention will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 4A is a schematic view illustrating a melt extrusion molding apparatus and FIG. 4B is a schematic view illustrating a laminate transfer molding apparatus;

FIG. 5A illustrates a first configuration example, FIG. 5B illustrates a second configuration example, and FIG. 5C illustrates a third configuration example;

DETAILED DESCRIPTION

Embodiments of the present application will be described below in detail with reference to the drawings.

First Embodiment

Configuration of Diffusion Sheet

Figure 1A:
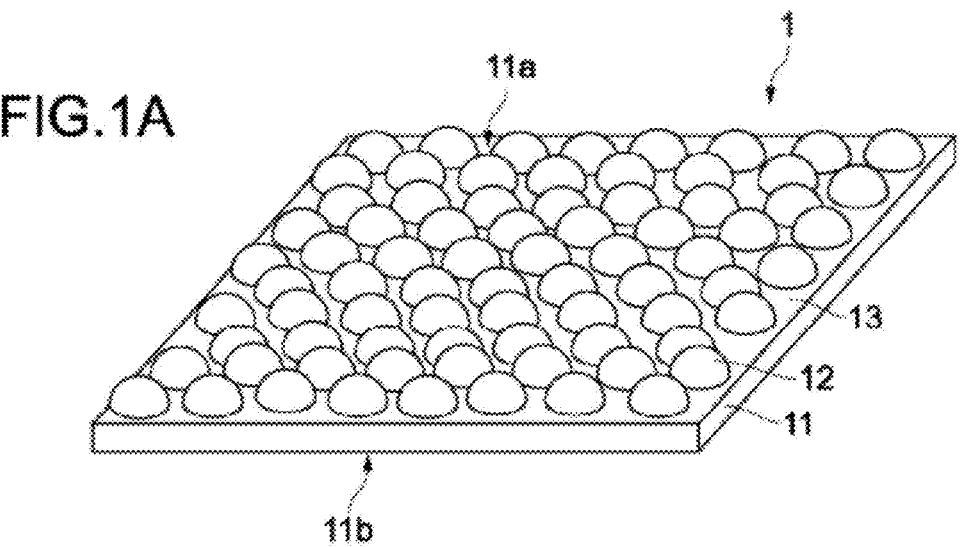
FIG. 1A is a schematic perspective view illustrating a main part of a diffusion sheet according to an embodiment and FIG. 1B is a schematic plan view illustrating the main part thereof.
Figure 1B:
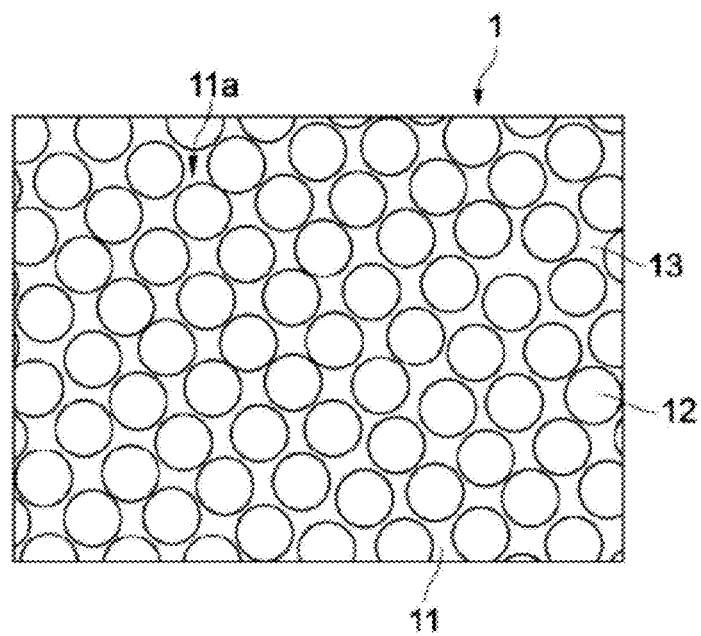

FIG. 1A is a schematic perspective view illustrating a main part of a diffusion sheet according to an embodiment. FIG. 1B is a schematic plan view illustrating a main part of the diffusion sheet. A diffusion sheet 1 according to this embodiment has a base member 11, structures 12 having convex shapes, and a flattened portion 13. The base member 11 has a main surface (first main surface) 11a and a main surface (second main surface) 11b. The structures 12 are formed on one main surface 11a of the base member 11. The flattened portion 13 is formed among the structures 12 on the main surface 11a.

The main surface 11b on a rear surface side of the diffusion sheet 1 forms an incident surface of light and the main surface 11a on a front surface side of the diffusion sheet 1 forms an output surface of light. Both of the main surface 11a and the main surface 11b of the diffusion sheet 1 are in contact with the air. The main surface 11a has optical functions such as a light diffusing function and a light collecting function using a difference in a refractive index on an interface between the main surface 11a and an air layer. In particular, the structures 12 have a light diffusing function and a light collecting function and the flattened portion 13 has a light diffusing function.

A sheet or a film having transparent property can be used as the base member 11. A well-known polymer material can be used as a material of the base member 11, for example. Triacetyl cellulose (TAC), polyester (TPEE), polyethylene terephthalate (PET), polyimide (PI), polyamide (PA), aramid, polyethylene (PE), polyacrylate, polyether sulphone, polysulphone, polypropylene (PP), diacetyl cellulose, polyvinyl chloride, acrylic resin (PMMA), polycarbonate (PC), epoxy resin, urea resin, urethane resin, melamine resin, and the like are exemplified as the well-known polymer material. The base member 11 may contain a filler, a plasticizer, a stabilizing agent, an antidegradant, a dispersant, a flame retardant, an ultraviolet absorber, and the like if needed. The thickness of the base member 11 is not particularly limited and is 25 µm to 300 µm from a viewpoint of productivity, for example.

A plurality of structures 12 having convex shapes are randomly (irregularly) formed on the main surface 11a of the base member 11. The structures 12 are integrally formed on the main surface 11a of the base member 11. That is to say, the diffusion sheet 1 has a monolayer structure formed with a single thermoplastic resin material. Interface reflection does not occur unlike a diffusion sheet having a multilayer structure by employing such a monolayer structure, thereby improving brightness. Further, a resin forming the diffusion sheet 1 can be recycled to be used.

(Structure)

Each structure 12 formed on the main surface 11a of the base member 11 has the same shape or substantially the same shape. In this embodiment, each structure 12 has a partial spherical shape. The partial spherical shape is a shape obtained by cutting out a portion of a spherical shape. In consideration of demolding property of the structures in a manufacturing process as will be described later, it is preferable that the partial spherical shape be smaller than a hemisphere. Further, the partial spherical shape includes a substantially partial spherical shape. The substantially partial spherical shape herein refers to a shape obtained by slightly deforming the partial spherical shape within a range without causing large deterioration in optical characteristics such as brightness in comparison with the partial spherical shape.

Figure 2A:
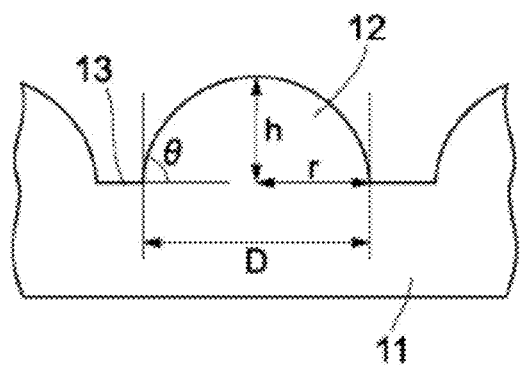
FIG. 2A is a schematic cross-sectional view illustrating a structure formed on a main surface of the diffusion sheet and FIG. 2B is a cross-sectional view illustrating a modification of the configuration thereof.

FIG. 2A is a schematic view for explaining a shape of each structure 12. A size of each structure 12 can be selected depending on shape transfer methods onto the structure 12. When a melt extrusion molding method is employed as the shape transfer method, an average diameter D of circular bottom surfaces of the structures 12 is equal to or larger than 50 µm and equal to or smaller than 100 µm, for example. If the average diameter D is smaller than 50 µm, transferability tends to be deteriorated. In contrast, if the average diameter D is larger than 100 µm, visibility tends to be deteriorated when the diffusion sheet 1 is mounted on a liquid crystal display apparatus. On the other hand, when a laminate transfer molding method is employed as the shape transfer method, an average diameter D of circular bottom surfaces of the structures 12 is equal to or larger than 20 µm and equal to or smaller than 50 µm, for example. If the average diameter D is smaller than 20 µm, it tends to be difficult to produce a master plate. In contrast, if the average diameter D is larger than 50 µm, productivity tends to be deteriorated. The melt extrusion molding method herein refers to a method of extruding a thermally molten resin into a sheet form and transferring irregularities of a master plate roller onto the sheet-form resin. Further, the laminate transfer molding method herein refers to a method of transferring irregularities of an emboss belt onto a sheet by thermal transfer. It is to be noted that molding apparatuses employing these molding methods will be described in detail later.

An aspect ratio h/r of the structures 12 (r: average radius of the structures, h: average height of the structures) is larger than 0.85 and equal to or smaller than 1.50, preferably, equal to or larger than 0.95 and equal to or smaller than 1.10. If the aspect ratio h/r is equal to or smaller than 0.85, brightness when one or more diffusion sheet(s) 1 is/are used in a backlight tends to be lowered. On the other hand, if the aspect ratio h/r is larger than 1.5, transferability tends to be deteriorated. When a plurality of diffusion sheets 1 are used in a backlight, it is preferable that an aspect ratio of the diffusion sheet 1 which is arranged at the farthest position from a light source among the plurality of diffusion sheets be the largest. This is because change in the aspect ratio of the diffusion sheet 1 which is arranged at the farthest position from the light source influences brightness of the backlight at the most significant level.

When a plurality of optical sheets including at least one diffusion sheet 1 are used in a backlight, the aspect ratio h/r of the structures 12 is larger than 0.50 and equal to or smaller than 1.50, preferably, equal to or larger than 0.55 and equal to or smaller than 1.10. If the aspect ratio h/r of the structures 12 is equal to or smaller than 0.50, brightness when the plurality of optical sheets are used in a backlight tends to be lowered. On the other hand, if the aspect ratio is larger than 1.50, transferability tends to be deteriorated. When a plurality of optical sheets including a plurality of diffusion sheets 1 are used in a backlight, it is preferable that an aspect ratio of the diffusion sheet which is arranged at the farthest position from a light source among the plurality of diffusion sheets be the largest. This is because change in the aspect ratio of the diffusion sheet which is arranged at the farthest position from the light source influences brightness of the backlight at the most significant level.

A side face angle θ of each structure 12 in the vicinity of a boundary between the structure 12 and the main surface 11a of the base member 11 is preferably equal to or larger than 65° and equal to or lower than 90°. If the side face angle θ is lower than 65°, brightness tends to be largely lowered. It is preferable that the side face angle θ be about 70°±2° in order to obtain higher brightness. On the other hand, if the side face angle θ is larger than 90°, it tends to be difficult to demold the structures 12. The expression "the side face angle of each structure 12 in the vicinity of a boundary between the structure 12 and the main surface 11*a* of the base member 11" herein refers to an angle formed by a tangent line of a contour of the structure 12 and a contour of the flattened portion in the vicinity of an intersection of a contour of a cut surface of the structure 12 and the contour of the flattened portion 13 when the structure 12 is cut along a center line thereof.

Figure 2B:
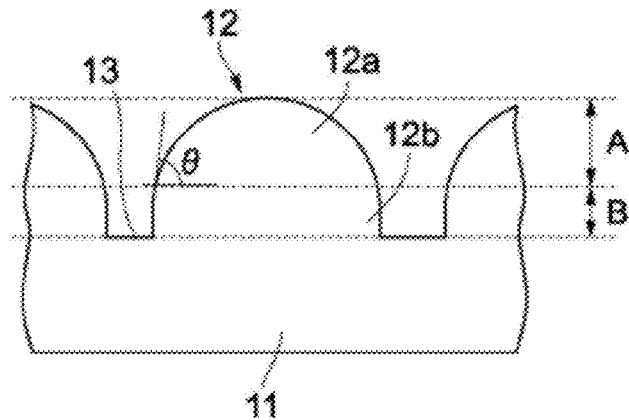

FIG. 2B is a schematic view illustrating another configuration example of the structures 12. As illustrated in FIG. 2B, each structure 12 may have a main body 12*a* having a lens function and a basal portion 12*b* extended toward the base member 11 from a bottom surface of the main body 12*a*. Even if there is variation in heights of the structures 12, the main bodies 12*a* of the structures 12 can be made to have hemispherical shapes or shapes close to the hemispherical shape by forming such basal portions 12*b*. That is to say, the side face angle of each structure 12 in the vicinity of a boundary between the structure 12 and the main surface 11*a* of the base member 11 can be made in an angle range of 65° or larger and 90° or lower as described above. Accordingly, brightness of the diffusion sheet 1 can be improved. Each main body 12*a* preferably has a partial spherical shape. The main body 12*a* herein refers to a section A which is in a range where an angle formed by a tangent line of a contour of each structure 12 and a contour of the flattened portion 13 among the structures 12 is equal to or larger than 0° and equal to or lower than 85° when the structures 12 and the flattened portion 13 among the structures 12 are observed from an in-plane direction of the diffusion sheet 1. Further, the basal portion 12*b* refers to a section B in a range where an angle formed by a tangent line of a contour of each structure 12 and a contour of the flattened portion 13 among the structures 12 is larger than 85° and equal to or lower than 90° when the structures 12 and the flattened portion 13 among the structures 12 are observed from an in-plane direction of the diffusion sheet 1.

An average length 1 of the basal portions 12*b* (height of the section B from the main surface 11*a* of the base member 11) is 0<1≤20 μm, for example. By setting the average length 1 of the basal portions 12*b* to be 0<1, even when there is variation in heights of the structures 12, the main bodies 12*a* of the structures 12 can be made to have hemispherical shapes or shapes close to the hemispherical shape as described above. Further, by setting the average length 1 of the basal portions 12*b* to be 1≤20 μm, deterioration of transferability can be suppressed.

A filling rate of the structures 12 with respect to the main surface 11*a* of the base member 11 is equal to or higher than 60% and equal to or lower than 80%, for example. If the filling rate is lower than 55%, brightness tends to be lowered. On the other hand, if the filling rate is higher than 80%, moire tends to be generated. The moire herein includes moire which is generated when a plurality of diffusion sheets 1 are laminated, moire with respect to panel pixels, which is generated when the diffusion sheet 1 and a liquid crystal panel are used in combination, and moire with respect to a diffusion plate pitch, which is generated when the diffusion sheet 1 and a diffusion plate are used in combination.

The structures 12 have the same height or substantially the same height. Variation (K) in heights of the structures 12 satisfies, for example, 0<K≤10%, preferably, 0<K≤8%. Brightness of the diffusion sheet 1 can be improved by setting the variation (K) of the heights of the structures 12 to be in such a range.

(Flattened Portion)

The flattened portion 13 is formed among the structures 12 on the main surface 11*a* of the base member 11. The flattened portion 13 is formed so as to surround each of the structures 12 on the same plane as the bottom surfaces of the structures 12.

A surface of the flattened portion 13 is roughened at an appropriate degree so as to obtain a diffusing function of light transmitted through the flattened portion 13. That is to say, as the surface roughness of the flattened portion 13 is larger, a higher haze value is obtained. On the other hand, as the haze value is higher, brightness in the frontal direction tends to be lowered. The haze value of the diffusion sheet 1 is also changed depending on a rate of the flattened portion 13 occupying the main surface 11*a* of the diffusion sheet 1, that is, the filling rate of the structures 12. Therefore, the surface roughness of the flattened portion 13 can be appropriately determined by the filling rate of the structures 12.

As described above, when the filling rate of the structures 12 is 60% to 80%, the surface roughness of the flattened portion 13 has an arithmetic mean roughness (Ra) equal to or lower than 0.6 μm, for example. By defining the surface roughness of the flattened portion 13 in such a manner, the haze of the flattened portion 13 can be adjusted to be appropriate while suppressing lowering of brightness. If the flattened portion 13 is roughened to have a surface roughness (Ra) equal to or larger than 0.2 μm and equal to or lower than 0.6 μm, the haze thereof can be increased by nearly 20% while suppressing a decrease rate of the front brightness to be equal to or lower than 3% in comparison with a case where the flattened portion is not roughened.

A method of forming the flattened portion 13 having the above surface roughness (Ra) is not particularly limited. In the embodiment, the diffusion sheet 1 is manufactured by using a molding apparatus as will be described later. In this case, the main surface 11*a* of the diffusion sheet 1 is formed by transferring a shape of the master plate used in the molding apparatus. Then, a flattened portion of the master plate corresponding to the flattened portion 13 is roughened so as to have a surface roughness in the above range so that the flattened portion 13 and the structures 12 are formed at the same time.

It is to be noted that the roughening of the flattened portion 13 is not limited to uniform roughening of the surface of the flattened portion 13 and includes a local roughening of the surface thereof. Specifically, the flattened surface is roughened by forming fine irregularities on the surface of the flattened portion 13, or by causing fine cracks to be generated on the surface thereof. Further, when the roughness of the flattened portion 13 has directional property, it is sufficient that roughness in at least one direction is equal to or lower than 0.6 μm.

(Others)

The main surface 11*b* on the rear surface side of the base member 11 is formed to be a flat surface. In this case, the main surface 11*b* may be a smooth surface. However, if the main surface 11*b* is roughened to an appropriate degree, the main surface 11*b* can be prevented from being damaged due to friction, thereby reducing defect in appearance. Further, if the main surface 11*b* is roughened, a light diffusing function of the main surface 11*b* is enhanced. Therefore, a haze value of the diffusion sheet 1 only is increased so as to contribute to reduction in unevenness of the brightness.

Figure 6:
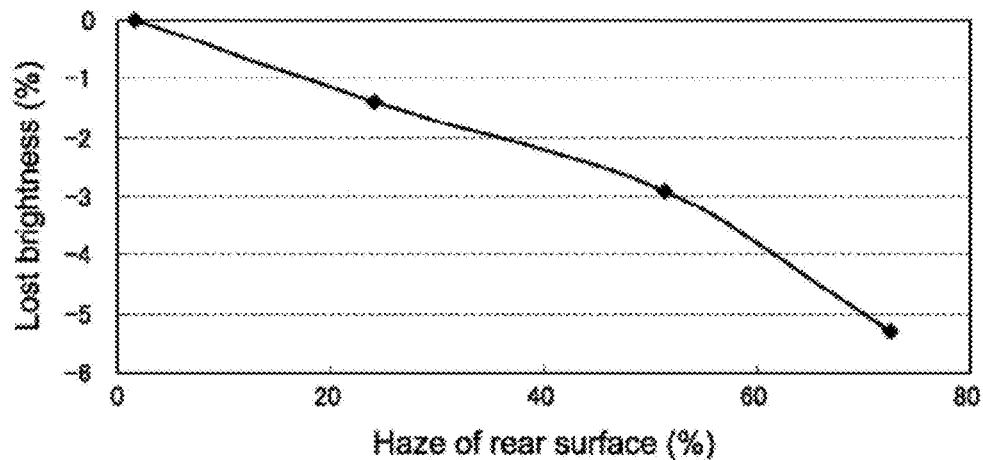
FIG. 6 is a graph showing one experimental result indicating a relationship between a haze of a rear surface of the diffusion sheet according to an embodiment and a lost brightness in the frontal direction.

On the other hand, front brightness tends to be lowered due to the increase in the haze of the main surface 11*b*. FIG. 6 is a graph showing an experimental result indicating an example of the tendency. A loss ratio of the front brightness increases along with the increase of the haze on the rear surface of the diffusion sheet as is obvious from FIG. 6. Accordingly, the surface roughness of the main surface 11b can be set in accordance with the haze value and front brightness characteristic of the target diffusion sheet 1. Further, the surface roughness of the main surface 11b is set in consideration of the haze value on the main surface 11a, in particular, the surface roughness of the flattened surface 13, the filling rate of the structures 12, and the like. If the filling rate of the structures 12 is equal to or higher than 60% and equal to or lower than 80% and the surface roughness (Ra) of the flattened portion 13 is equal to or lower than 0.6 µm, the surface roughness (Ra) of the main surface 11b is equal to or lower than 0.5 µm, for example.

Method of Manufacturing Diffusion Sheet

Next, an example of a method of manufacturing the diffusion sheet 1 is described with reference to FIGS. 3A through 3F.

(Resist Layer Formation Process)

Figure 3A:
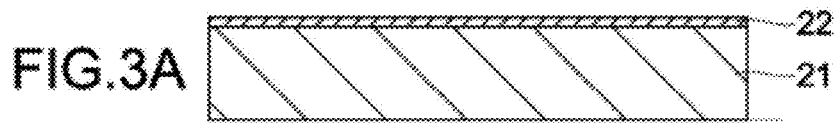
FIGS. 3A through 3G are schematic cross-sectional views illustrating each step for explaining a method of manufacturing a diffusion sheet according to an embodiment.

At first, a resist layer 22 is formed on a surface of a master plate production base member 21 which is a target to be processed (see, FIG. 3A). The master plate production base member 21 as a target to be processed is formed of a metal material, for example. The surface of the master plate production base member 21 may be previously subjected to plating processing such as copper plating. A shape of the master plate production base member 21 as a target to be processed includes a plate shape, a sheet shape, a film shape, a block shape, a columnar shape, a cylindrical shape, a circular shape, and the like. For example, any of an inorganic resist and an organic resist can be used as a material of the resist layer 22. It is to be noted that when the master plate production base member 21 has a columnar shape or a cylindrical shape, the resist layer 22 is formed on an outer circumferential surface thereof.

(Exposure Process)

Figure 3B:
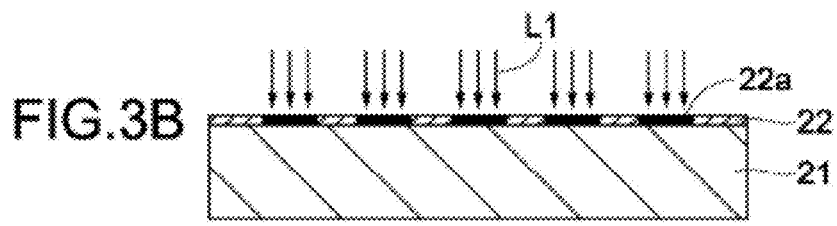

Next, exposure portions 22a are randomly formed on the resist layer 22 by irradiating the resist layer 22 with light L1 such as a laser beam, for example (see, FIG. 3B). A shape of each exposure portion 22a formed on the resist layer 22 is a circular shape or a substantially circular shape, for example. When the exposure portions each having such a shape are formed, the size of each exposure portion 22a is selected depending on types of a transfer method used in a shape transfer process which will be described later. For example, when a melt extrusion molding method is used as the transfer method, an average diameter D of bottom surfaces of the exposure portions is equal to or larger than 50 µm and equal to or smaller than 100 µm, for example. When a laminate transfer molding method is used as the transfer method, an average diameter D of the bottom surfaces of the exposure portions is equal to or larger than 20 µm and equal to or smaller than 50 µm, for example.

(Development Process)

Figure 3C:
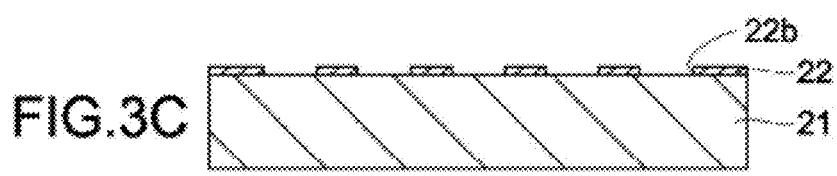
Figure 3D:
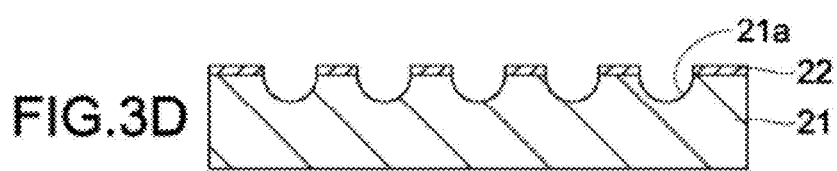

Then, the resist layer 22 on which the exposure portions 22a have been formed is developed. With the development, openings 22b corresponding to the exposure portions 22a are formed on the resist layer 22 (see, FIG. 3C). In FIG. 3C, the openings 22b are formed so as to correspond to the exposure portions by using a positive resist as the resist. However, the resist is not limited to the example. That is to say, the exposure portions may be left by using a negative resist as the resist.

(Etching Process)

Subsequently, a surface of the master plate production base member 21 is etched by using the resist layer 22 on which the openings 22b have been formed as a mask. With the etching, recesses 21a having the same depth or substantially the same depth are formed on the surface of the master plate production base member 21 (see, FIG. 3D). Any of dry etching and wet etching can be employed as the etching. However, from a viewpoint that a facility for etching is simpler, the wet etching is preferably employed. Further, for example, any of isotropic etching and anisotropic etching can be employed as the etching and can be appropriately selected depending on shapes of the structures 12 to be desired.

(Resist Removal Process)

Figure 3E:

Then, the resist layer 22 formed on the surface of the master plate production base member is removed by ashing or the like (see, FIG. 3E). As a result, a master plate 23 having an irregular surface is obtained. The irregular surface includes recesses 21a having inverted shapes of the structures 12 and a flattened portion 21b which has been covered by the resist layer 22.

(Plating Process)

Then, a plating layer such as a nickel plating, a nickel-phosphorous plating, or a chromium plating is formed by subjecting the irregular surface of the master plate 23 to a plating process if needed. In this embodiment, the irregular surface of the master plate 23 is subjected to the chromium plating.

(Roughening Process)

Figure 3F:
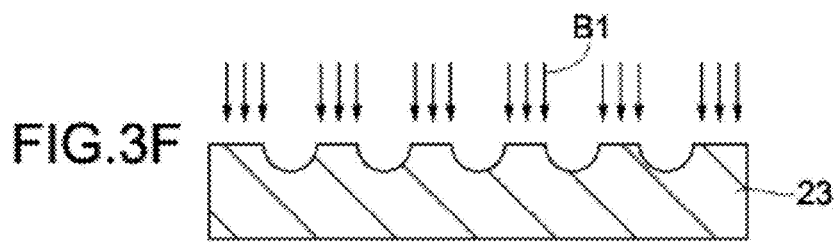

Subsequently, the flattened portion 21b of the master plate 23 is roughened. In this embodiment, the flattened portion 21b of the master plate 23 is subjected to the blast processing so as to roughen the flattened portion 21b (see, FIG. 3F). That is to say, as illustrated in FIG. 3F, a surface of the flattened portion 21b is roughened by spraying blast particles B1 onto the master plate 23 at high speed. Although glass particles are used as the blast particles, the blast particles are not limited thereto and metal particles, resin particles, or the like may be used.

Further, if the master plate 23 receives irradiation with the blast particles, fine cracks are caused on the chromium plating covering the flattened portion 21b of the master plate 23 in some case. The cracks generated on the chromium plating play a role of increasing the surface roughness of the flattened portion 21b in addition to an action of deforming the surface due to collision against the blast particles.

On the other hand, in order to prevent inner surfaces of the recesses 21a from being roughened, blast particles each having a particle diameter larger than a diameter (opening diameter) of each recess 21a are used. Therefore, surface smoothness of the structures 12 of the diffusion sheet 1 which has been produced by using the master plate 23 as will be described later is kept, thereby suppressing deterioration of the front brightness.

Figure 7:
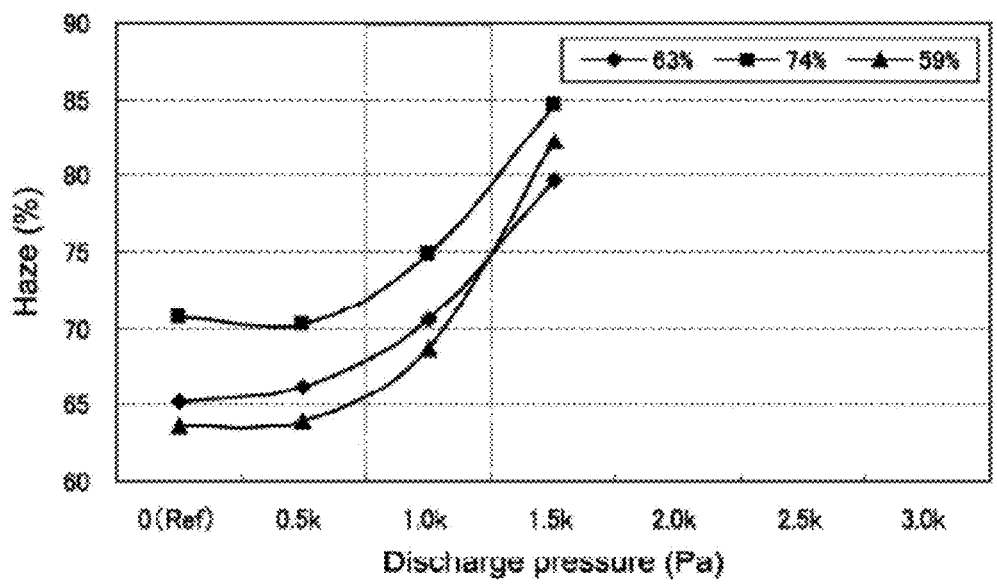
FIG. 7 is a graph showing one experimental result indicating a relationship between a discharge pressure of blast particles and a haze of a diffusion sheet produced by using the master plate in blast processing onto a master plate for manufacturing a diffusion sheet according to an embodiment.

Blast processing conditions are set in consideration of the filling rate of the structures 12 constituting the main surface 11a, for example, because the blast processing conditions influence the haze value and the front brightness of the main surface 11a of the diffusion sheet 1 onto which shape transfer is performed by using the master plate 23. For example, FIG. 7 is a graph showing an experimental result indicating a relationship between a discharge pressure of the blast particles (irradiation pressure onto the master plate) and the haze value of the diffusion sheet main surface 11b onto which shape transfer has been performed by using the master plate. Further, FIG. 8 is a graph showing an experimental result indicating a relationship between a discharge pressure of the blast particles B1 onto the master plate 23 and the front brightness of the diffusion sheet main surface 11b onto which shape transfer has been performed by using the master plate.

Three samples each having a filling rate of the structures 12 of 59% (sample 1), 63% (sample 2), and 74% (sample 3) were used as measurement samples. In this embodiment, glass beads each having a particle diameter of 75 to 90 µm were used as the blast particles and a distance between discharge nozzles of the blast particles and the flattened portion 21b of the master plate 23 was set to 20 cm. A discharge pressure of the blast particles was set by an ejection pressure of the air. A cylindrical master plate, an outer circumferential surface of which has been subjected to chromium plating, was used as the master plate 23. The master plate 23 were irradiated with the blast particles while being rotated about a shaft thereof by 50 times per minute. Three types of master plates corresponding to the samples 1 to 3 were prepared. A diameter of the recesses on the master plate for producing the sample 1 was set to 68 µm, a diameter of the recesses on the master plate for producing the sample 2 was set to 70 µm, and a diameter of the recesses on the master plate for producing the sample 3 was set to 76 µm.

Figure 8:
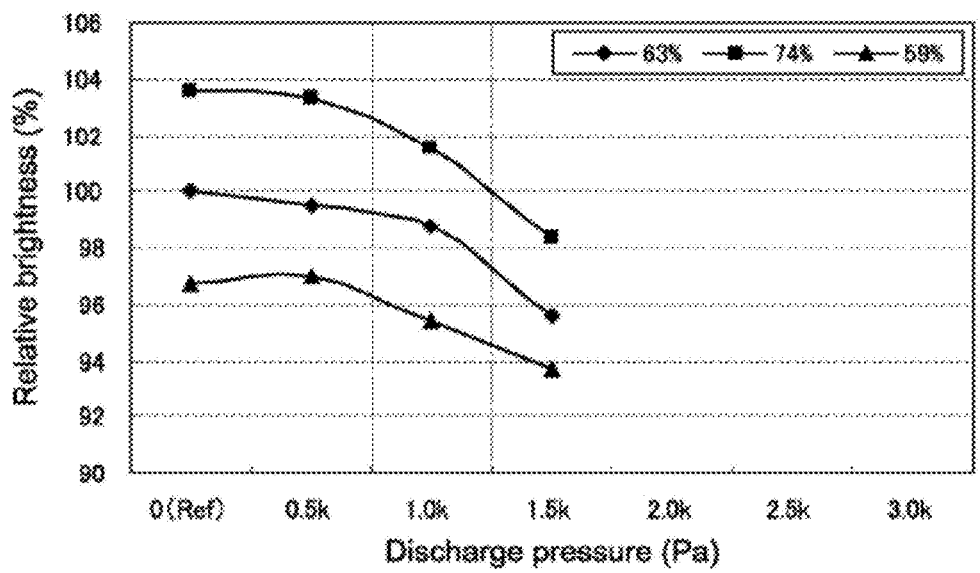
FIG. 8 is a graph showing one experimental result indicating a relationship between the discharge pressure of the blast particles and a front brightness of the diffusion sheet produced by using the master plate in the blast processing onto the master plate for manufacturing a diffusion sheet according to an embodiment.

As is seen from FIG. 7 and FIG. 8, the haze value tends to increase and the front brightness tends to decrease along with the increase of the discharge pressure of the blast particles. In FIG. 8, the front brightness is represented by "relative brightness" while setting the front brightness of the sample 2 as a reference. If the discharge pressure of each sample is larger than 1 kPa, the decrease in the brightness and the increase in the haze are drastically larger. The reason for the decrease in the brightness can be considered to be deformation of edge portions of the recesses 21a due to the collision action against the blast particles. As is seen from FIG. 7 and FIG. 8, the haze of each sample can be increased to nearly 80% while suppressing the decrease in the brightness to equal to or lower than 4% in a range where the discharge pressure of the blast particles is approximately 0.7 to 1.3 kPa.

Figure 9:
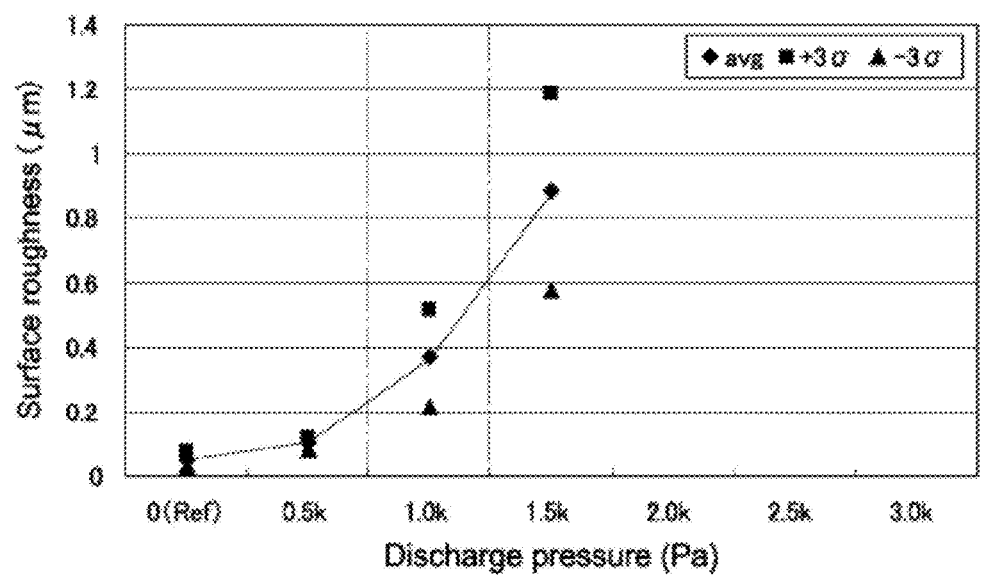
FIG. 9 is a graph showing one experimental result indicating a relationship between the discharge pressure of the blast particles and a surface roughness (Ra) of the master plate in the blast processing onto the master plate for manufacturing a diffusion sheet according to an embodiment.

The surface roughness (Ra) of the flattened portion 21b is different depending on irradiation pressures (discharge pressure) of the blast particles onto the flattened portion 21b, particle diameters of the blast particles, types of the blast particles, and the like. Accordingly, these processing conditions are desired to be considered in order to obtain a desired surface roughness. For example, FIG. 9 is a graph showing an experimental result indicating a relationship between the discharge pressure of the blast particles B1 onto the master plate 23 and the surface roughness (Ra) of the flattened portion 13 on the diffusion sheet main surface 11b onto which shape transfer has been performed by using the master plate. Master plates for producing the above samples 1 to 3 are used as the master plate 23. Further, in FIG. 9, an average value of the surface roughnesses of the flattened portions of the master plates and the deviations thereof (+3σ, -3σ) are plotted.

As shown in FIG. 9, as the discharge pressure of the blast particles is larger, the surface roughness (Ra) of the flattened portion 21b increases. The surface roughness (Ra) equal to or larger than 0.2 µm and equal to or lower than 0.6 µm can be obtained when the discharge pressure of the blast particles is in a range of 0.7 to 1.3 kPa as in the above example.

Figure 10:
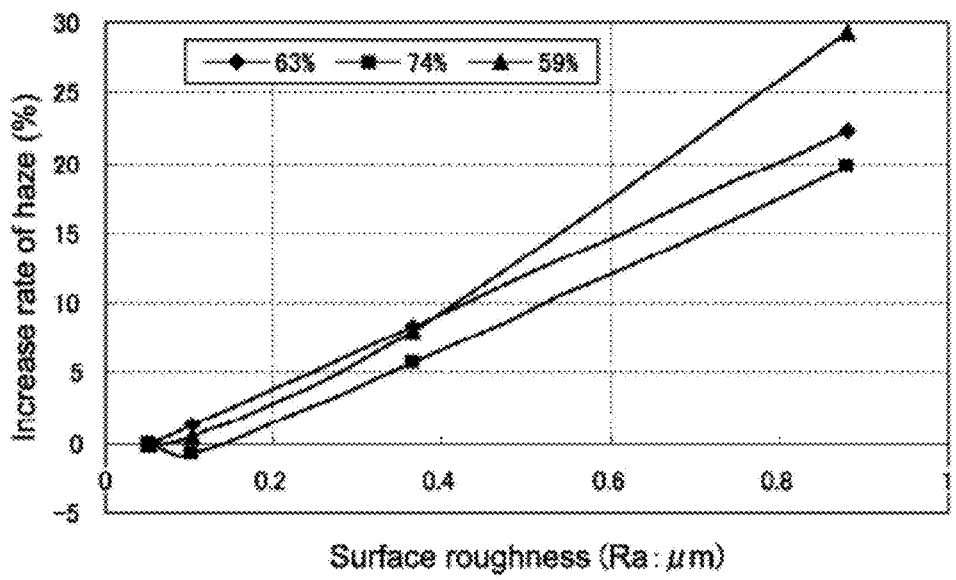
FIG. 10 is a graph showing one experimental result indicating a relationship between a surface roughness of a flattened portion and an increase rate of the haze on a diffusion sheet according to an embodiment.
Figure 11:
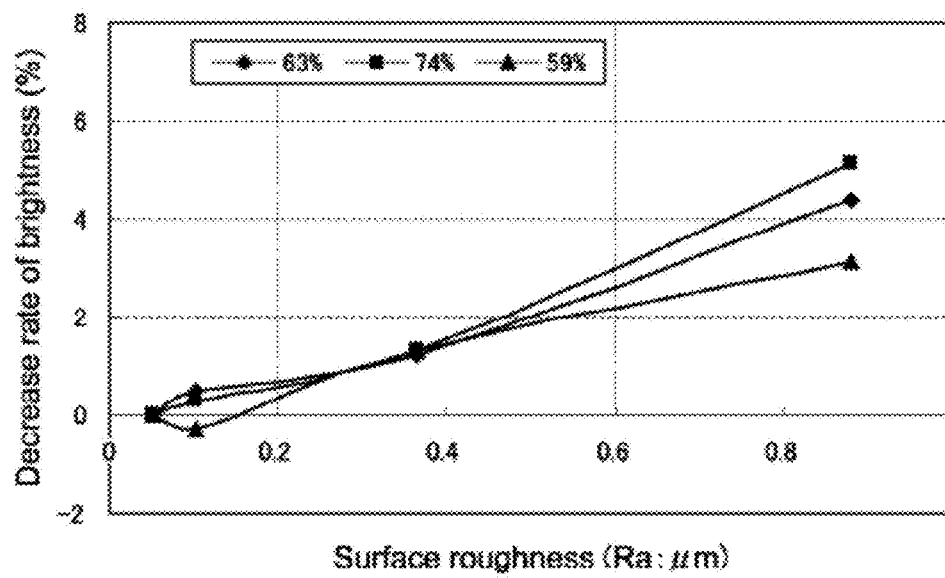
FIG. 11 is a graph showing one experimental result indicating a relationship between the surface roughness of the flattened portion and a decrease rate of brightness in the frontal direction on a diffusion sheet according to an embodiment.

FIG. 10 and FIG. 11 are graphs showing experimental results indicating a relationship between the surface roughness (Ra) of the flattened portion 13 of the diffusion sheet main surface 11b and an increase rate of the haze value of the diffusion sheet 1 and a relationship between the surface roughness (Ra) of the flattened portion 13 of the diffusion sheet main surface 11b and a decrease rate of the front brightness, respectively. Three samples having different filling rates of the structures 12, which have been produced by using the master plates for producing the above samples 1 to 3, were used as measurement samples. As shown in FIG. 10 and FIG. 11, as the filling rate of the structures 12 is lower, a total area of the flattened portion 13 increases and the increase rate of the haze becomes higher. As the filling rate of the structures 12 is higher, the decrease rate of the brightness becomes higher. It can be considered that these tendencies are caused by the deformation of the edges of the recesses on the master plate, which form the structures 12.

As described above, when the surface roughness (Ra) of the flattened portion 13 is in a range of 0.2 µm or larger and 0.6 µm or lower, the haze value can be increased by 5 to 18% while suppressing the decrease rate of the brightness to equal to or lower than 3% in comparison with a case where the flattened portion is not roughened.

(Shape Transfer Process)

Next, the produced master plate 23 is attached to the molding apparatus such as the melt extrusion molding apparatus or the laminate transfer molding apparatus, for example. Next, the shapes of the recesses 21a and the flattened portion 21b on the master plate 23 are transferred onto one main surface of the base member 11 (see, FIG. 3G).

As described above, the diffusion sheet 1 in which a plurality of structures 12 having convex shapes and the flattened portion 13 having a predetermined surface roughness, which is arranged among the structures 12, are formed on the main surface 11a of the base member 11 as illustrated in FIG. 1 is manufactured.

Figure 12:
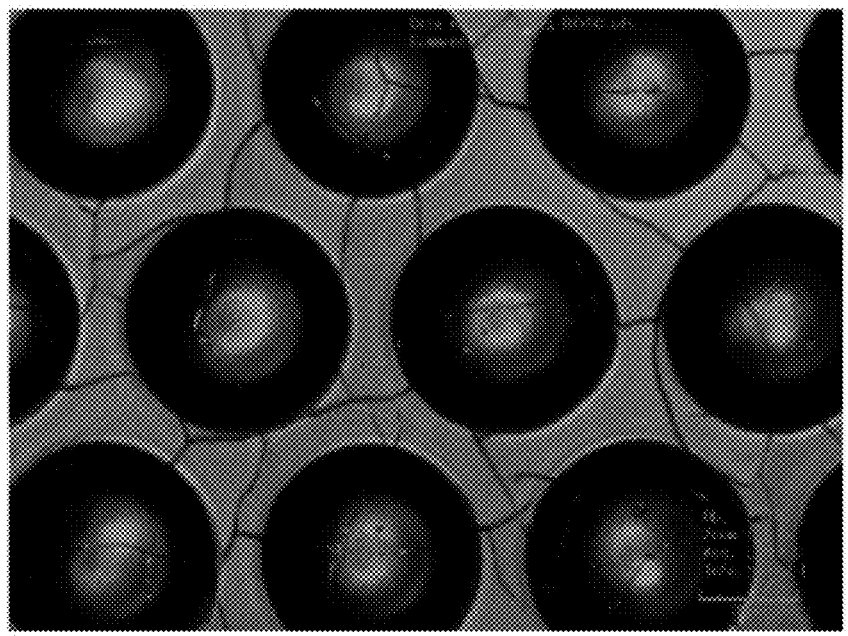
FIG. 12 is an enlarged picture of a main surface of a diffusion sheet obtained by performing the blast processing on a master plate for manufacturing a diffusion sheet according to an embodiment at a discharge pressure of 0.5 kPa.
Figure 13:
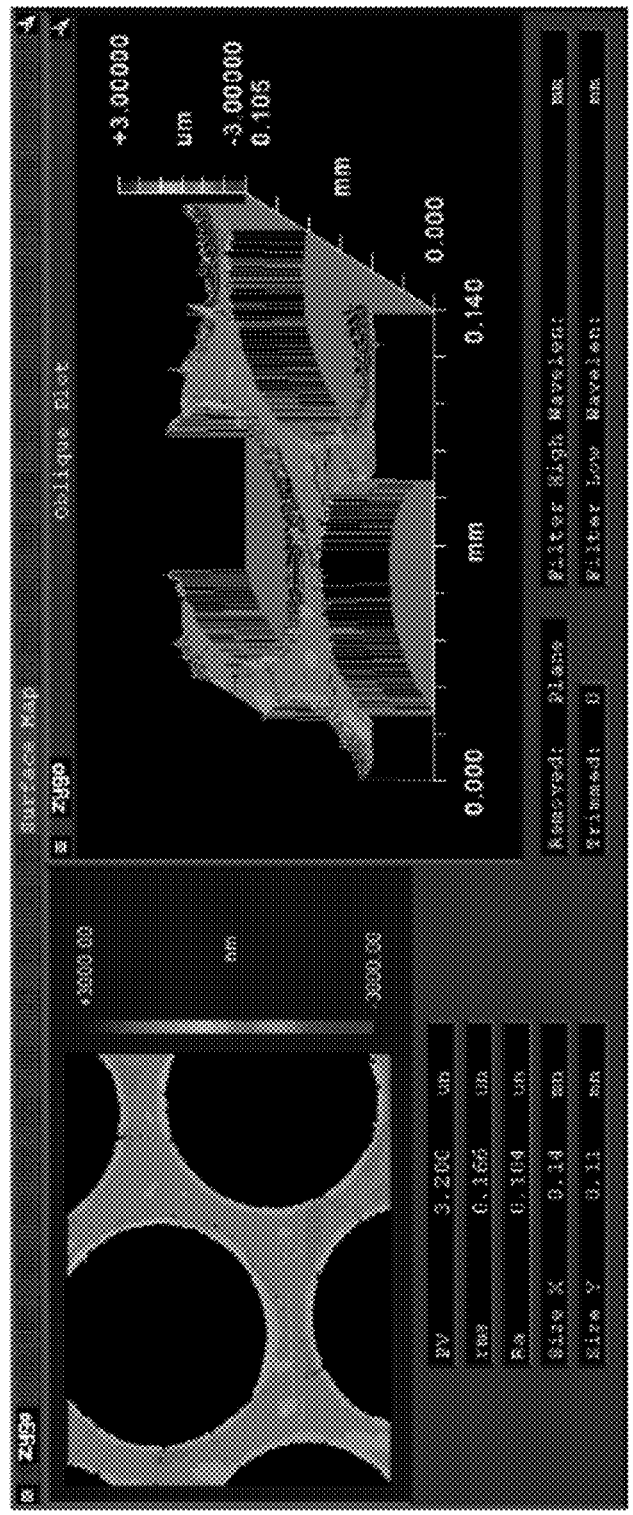
FIG. 13 is a picture showing a measurement result of a surface roughness of the flattened portion on the diffusion sheet as illustrated in FIG. 12.

FIG. 12 is a micrograph showing the main surface 11a of the diffusion sheet 1 produced by using the master plate 23 which has been subjected to the blast processing at a discharge pressure of 0.5 kPa. In FIG. 12, a plurality of cracks extended in a network form are observed on the flattened portion surrounding the circular structures. FIG. 13 is measurement data of the surface roughness of the flattened portion of the sheet sample as shown in FIG. 12. In this example, the surface roughness (Ra) of the flattened portion was 0.104 µm. It is to be noted that a surface roughness measurement instrument "Newview series" manufactured by Zygo Corporation was used as a measurement device (the same instrument was used in the following examples).

Figure 14:
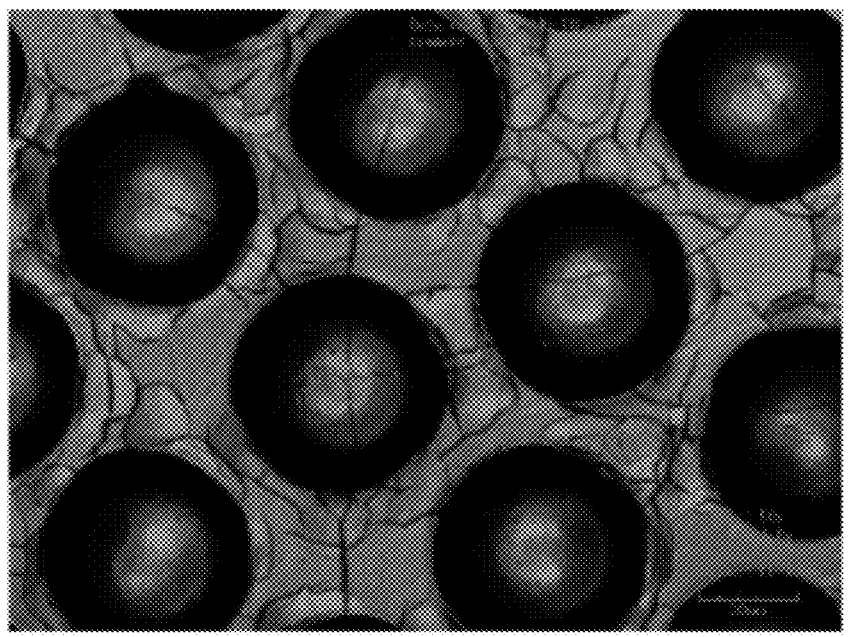
FIG. 14 is an enlarged picture of a main surface of a diffusion sheet obtained by performing the blast processing on a master plate for manufacturing a diffusion sheet according to an embodiment at a discharge pressure of 1.0 kPa.
Figure 15:
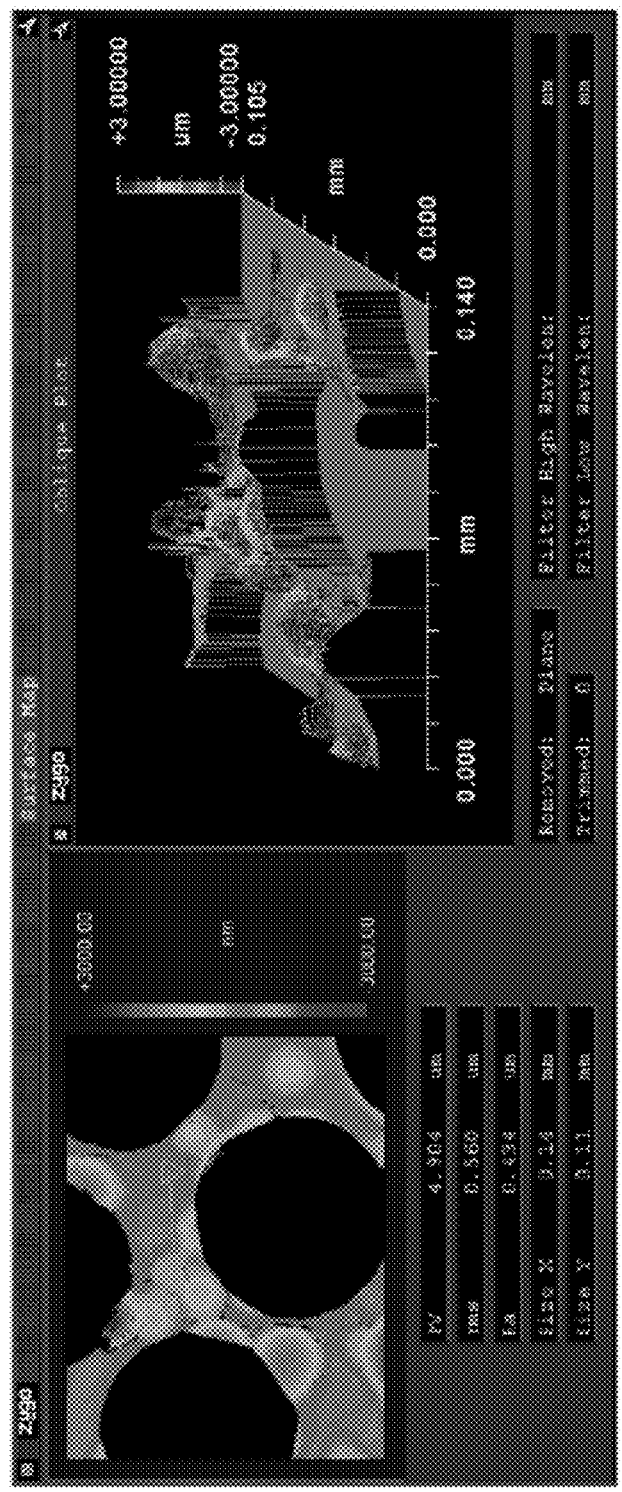
FIG. 15 is a picture showing a measurement result of a surface roughness of the flattened portion on the diffusion sheet as illustrated in FIG. 14.

FIG. 14 is a micrograph showing the main surface 11a of the diffusion sheet 1 produced by using the master plate 23 which has been subjected to the blast processing at a discharge pressure of 1.0 kPa. In FIG. 14, a plurality of cracks extended in a network form and fine irregularities formed by collision against the blast particles are observed on the flattened portion surrounding the circular structures. FIG. 15 is measurement data of the surface roughness of the flattened portion of the sheet sample as shown in FIG. 14. In this example, the surface roughness (Ra) of the flattened portion was 0.434 µm.

Figure 16:
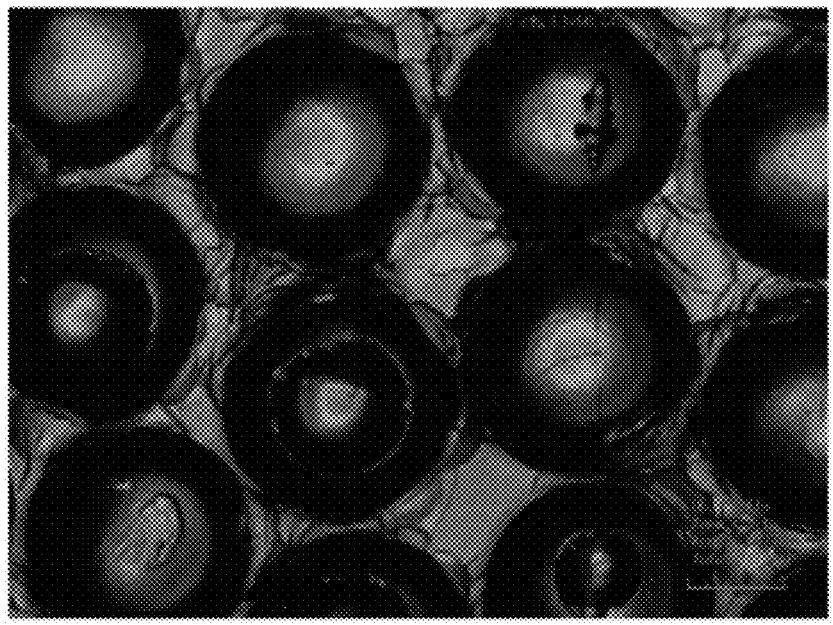
FIG. 16 is an enlarged picture of a main surface of a diffusion sheet obtained by performing the blast processing on a master plate for manufacturing a diffusion sheet according to an embodiment at a discharge pressure of 1.5 kPa.
Figure 17:
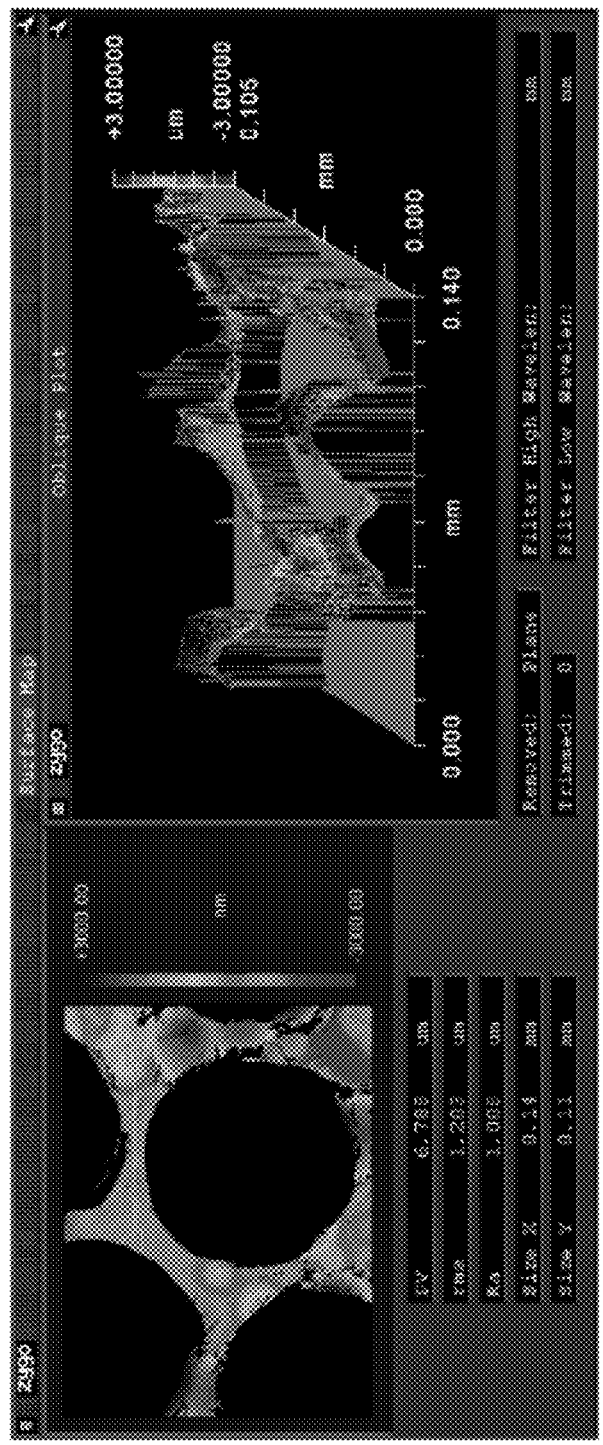
FIG. 17 is a picture showing a measurement result of a surface roughness of the flattened portion on the diffusion sheet as illustrated in FIG. 16.

FIG. 16 is a micrograph showing the main surface 11a of the diffusion sheet 1 produced by using the master plate 23 which has been subjected to the blast processing at a discharge pressure of 1.5 kPa. In FIG. 16, a plurality of cracks extended in a network form and fine irregularities formed by collision against the blast particles are observed on the flattened portion surrounding the circular structures. Further, a state in which boundary portions between the structures and the flattened portion are locally deformed is observed in FIG. 16. FIG. 17 is measurement data of the surface roughness of the flattened portion of the sheet sample as shown in FIG. 16. In this example, the surface roughness (Ra) of the flattened portion was 1.008 µm.

Molding Apparatus of Diffusion Sheet

First Example of Molding Apparatus

Figure 4A:
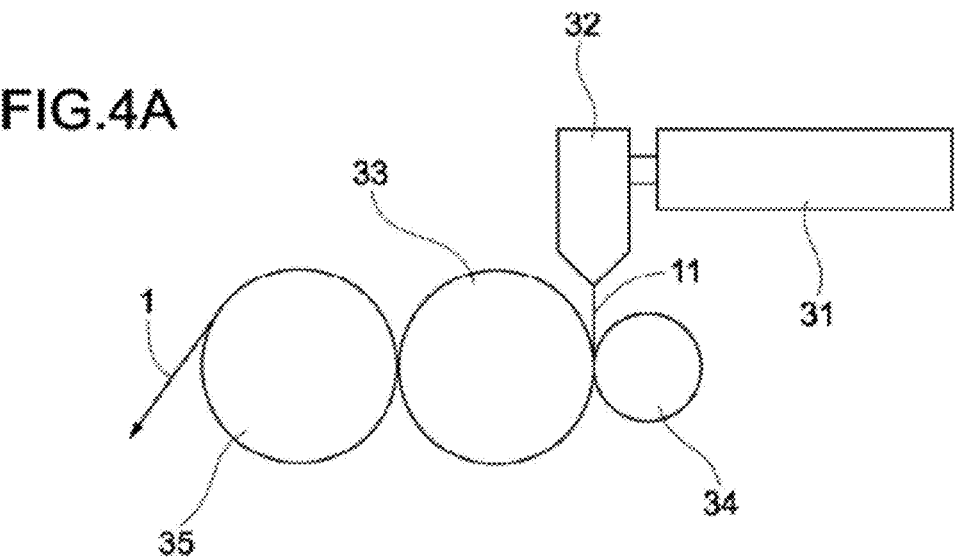
FIGS. 4A and 4B are schematic views illustrating a configuration example of a molding apparatus for manufacturing the diffusion sheet according to an embodiment.

FIG. 4A is a schematic view illustrating a configuration example of a melt extrusion molding apparatus. As illustrated in FIG. 4A, a melt extrusion molding apparatus 30 includes an extruder 31, a T die 32, a molding roller 33, an elastic roller 34 and a cooling roller 35. The molding roller 33 is an example of the above master plate 23.

The extruder 31 melts a resin material supplied from a hopper (not shown) and supplies the resin material to the T die 32. The T die 32 is a die having a linear opening and enlarges the resin material supplied from the extruder 31 to a width of a sheet to be molded and discharges the extended resin material.

The molding roller 33 has a columnar shape and is configured so as to rotate about a center shaft thereof as a rotational shaft. Further, the molding roller 33 is configured so as to be cooled. To be more specific, the molding roller 33 has one or two or more flow paths for causing a cooling medium such as an oil medium to flow therethrough.

Irregularities for transferring a fine pattern onto a sheet discharged from the T die 32 are provided on a columnar surface of the molding roller 33. For example, the irregularities are fine irregularities for transferring shapes of the structures 12 onto the base member 11. The irregularities are preferably formed by combining the photolithography process and the etching process as described above. This is because the variation in the heights of the structures 12 can be suppressed. The irregularities include the irregular surface of the master plate 23 as described with reference to FIG. 3G.

The elastic roller 34 has a columnar shape and is configured so as to rotate about a center shaft thereof as a rotational shaft. Further, a surface of the elastic roller 34 is configured so as to be elastically deformed. If a sheet is nipped by the molding roller 33 and the elastic roller 34, a surface which is in contact with the molding roller 33 gets pressed.

The elastic roller 34 is covered by a seamless pipe formed of Ni plating, for example. An elastic member with which a surface of the elastic roller 34 can be elastically deformed is included in the elastic roller 34. The configuration and material of the elastic roller 34 is not limited as long as the surface of the elastic roller 34 is elastically deformed when the elastic roller 34 comes into contact with the molding roller 33 at a predetermined pressure. A rubber material, a metal, a composite material or the like can be used as the material of the elastic roller 34, for example. Further, the elastic roller 34 is not limited to a roller form and may be formed into a belt form. The elastic roller 34 is configured so as to be cooled. To be more specific, the elastic roller 34 has one or two or more flow paths for causing a cooling medium such as water to flow therethrough.

A surface of the elastic roller 34 may be roughened to an appropriate degree. In this case, a rear surface (main surface 11b) of the diffusion sheet to be produced can be roughened. The surface roughness (Ra) of the elastic roller 34 is equal to or lower than 0.5 μm, for example.

The cooling roller 35 has a columnar shape and is configured so as to rotate about a center shaft thereof as a rotational shaft. The cooling roller 35 is configured so as to be cooled. To be more specific, the cooling roller 35 has one or two or more flow paths for causing a cooling medium such as water to flow therethrough.

Next, operations of the melt extrusion molding apparatus 30 having the above configuration are described.

At first, a resin material is melt by the extruder 31 so as to be sequentially supplied to the T die 32. Then, a sheet is continuously discharged from the T die 32. Next, the sheet discharged from the T die 32 is nipped by the molding roller 33 and the elastic roller 34. Therefore, irregularities of the molding roller 33 are transferred onto the resin material. Subsequently, the base member 11 is removed from the molding roller 33 with the cooling roller 35 while suppressing flopping of the base member 11 by nipping the base member 11 by the molding roller 33 and the cooling roller 35.

With the above operations, a desired diffusion sheet 1 can be obtained.

Second Example of Molding Apparatus

Figure 4B:
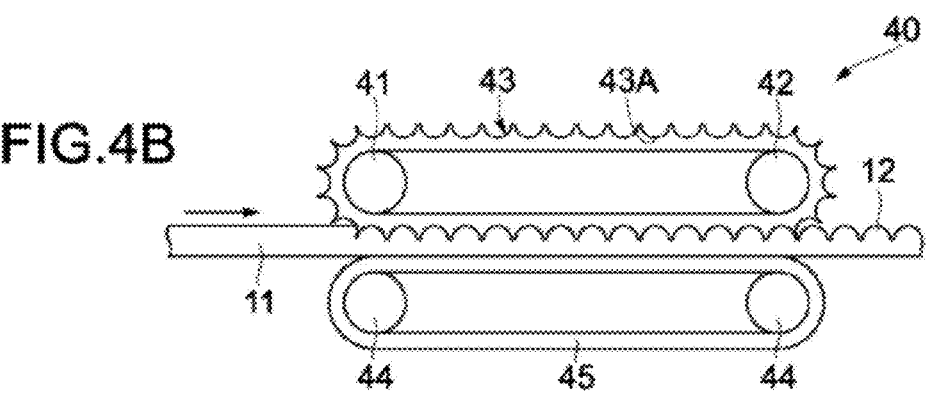

FIG. 4B is a schematic view illustrating a configuration example of a laminate transfer molding apparatus. A laminate transfer molding apparatus 40 includes an emboss belt 43 which rotates by a heating roller 41 and a cooling roller 42 and a flat belt 45 which rotates by two pressure rollers 44. The pressure rollers 44 are arranged so as to be opposed to the heating roller 41 and the cooling roller 42. The base member 11 before the shape transfer is performed can be inserted into a space between the emboss belt 43 having a plurality of recesses 43A on the surface thereof and the flat belt 45 having no stereoscopic shape. The emboss belt 43 is an example of the above master plate 23.

Figure 3G:
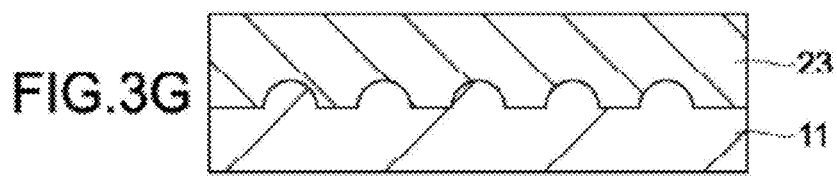

The master plate 23 described with reference to FIG. 3G can be used as the emboss belt 43. In this case, the recesses 43A are formed of the irregular surface having the recesses 21a and the flattened portion 21b of the master plate 23. Further, the rear surface (main surface 11b) of the diffusion sheet to be produced can have a surface roughness at an appropriate degree by roughening the surface of the flat belt 45.

Next, operations of the laminate transfer molding apparatus 40 having the above configuration are described.

At first, the emboss belt 43 and the flat belt 45 are rotated so that the base member 11 before the shape transfer is performed is inserted into a space between both of the belts from the side of the heating roller 41. Accordingly, one main surface of the base member 11 is melt just momentarily with heat of the heating roller 41 so that shapes of the recesses 43A are transferred onto one main surface of the base member 11. Thereafter, a surface of the base member 11 onto which the shapes of the recesses 43A have been transferred is cooled by the cooling roller 42 so that a surface shape is fixed. That is to say, a plurality of structures 12 are formed on one main surface of the base member 11.

With the above operations, a desired diffusion sheet 1 can be obtained.

In the diffusion sheet 1 according to this embodiment, the structures 12 are randomly formed on the main surface 11a, thereby suppressing generation of moire. Further, the flattened portion 13 formed among the structures 12 on the main surface 11a has a surface roughness (Ra) equal to or lower than 0.6 μm. Therefore, the flattened portion 13 has a diffusing function of light transmitted through the flattened portion 13. Accordingly, a light diffusing function can be improved while suppressing lowering of brightness in the front direction.

According to this embodiment, since the light diffusing function can be enhanced while suppressing lowering of the brightness in the front direction, unevenness in the brightness due to rolling of the diffusion sheet is hardly recognized visually. This makes it possible to sufficiently meet a demand for making the diffusion sheet 1 thinner.

Further, by adjusting the surface roughness of the main surface 11b and the flattened portion 13, even when a filing rate of the structures 12 is set to be equal to or higher than 80%, moire can be prevented from being generated.

Second Embodiment

Configuration of Liquid Crystal Display Apparatus

First Configuration Example

Figure 5A:
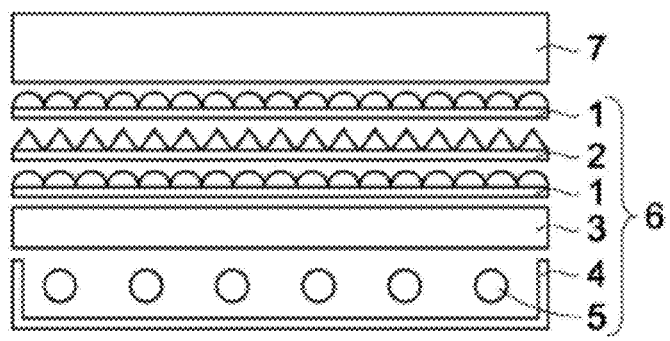
FIGS. 5A through 5C are schematic configuration views illustrating a liquid crystal display apparatus according to an embodiment.

FIG. 5A is a schematic view illustrating a first configuration example of a liquid crystal display apparatus according to a second embodiment. As illustrated in FIG. 5A, the liquid crystal display apparatus includes a backlight 6 which outputs light and a liquid crystal panel 7 which modulates light output from the backlight 6 temporarily and spatially so as to display an image.

Hereinafter, the backlight 6 and the liquid crystal panel 7 which constitute the liquid crystal display apparatus are sequentially described.

(Backlight)

For Example, a Direct-Type Backlight, an Edge-Type Backlight, or a planar light source-type backlight can be used as the backlight 6. In FIG. 5A, the backlight 6 of the direct type is illustrated. The backlight 6 includes a reflection sheet 4, light sources 5, a diffusion plate 3, two diffusion sheets 1, and a lens sheet 2, for example. The reflection sheet 4 is arranged on a rear surface side as an opposite side to a display surface of the liquid crystal display apparatus. The diffusion plate 3, the diffusion sheet 1, the lens sheet 2, and the diffusion sheet 1 are arranged between the light sources 5 and the liquid crystal panel 7 in this order from the light sources 5 toward the liquid crystal panel 7.

A Cold Cathode Fluorescent Lamp (CCFL), a Hot Cathode Fluorescent Lamp (HCFL), an Organic Electro Luminescence (OEL), an Inorganic Electro Luminescence (IEL), a Light Emitting Diode (LED), or the like can be used as the light sources 5, for example.

The reflection sheet 4 is a sheet which diffuses and reflects lights output from the light sources 5 so as to enhance utilization efficiency of the light. For example, a diffusion reflection (white) type reflection sheet, a mirror reflection type reflection sheet, or the like can be used as the reflection sheet 4. For example, a white polyester film or a multiple interface reflection sheet (for example, super white polyester film) can be used as the diffusion reflection type reflection sheet 4. For example, a metal thin film such as an Ag thin film can be used as the mirror reflection type reflection sheet 4.

The lens sheet 2 is a sheet which collects diffusion light from the light sources 5 so as to improve brightness. For example, a prism sheet having a sharp prism top, a prism sheet having a round prism top, a prism sheet having a random prism pattern formed on one main surface, an optical sheet (web sheet) having a uniform web pattern formed on one main surface, or the like can be used as the lens sheet 2.

The diffusion sheet according to the above first embodiment can be used for each of the diffusion sheets 1. Each diffusion sheet 1 is arranged such that one main surface 11a faces to the side of the liquid crystal panel 7 and the other main surface 11b faces to the side of the light source 5.

(Liquid Crystal Panel)

For example, a liquid crystal panel in a display mode such as a Twisted Nematic (TN) mode, a Super Twisted Nematic (STN) mode, a Vertically Aligned (VA) mode, an In-Plane Switching (IPS) mode, an Optically Compensated Birefringence (OCB) mode, a Ferro-electric Liquid Crystal (FLC) mode, a Polymer Dispersed Liquid Crystal (PDLC) mode, and a Phase Change Guest Host (PCGH) mode can be used as the liquid crystal panel 7.

Further, the backlight 6 further includes a reflection type polarizer (not shown) so that light emitted from the light sources 5 can be effectively used. Therefore, brightness of the liquid crystal display apparatus can be increased and power consumption thereof can be reduced. The reflection type polarizer is arranged on the side of the liquid crystal panel so as to be adjacent to the liquid crystal panel 7. The reflection type polarizer makes one of polarization components perpendicular to each other transmit therethrough and reflects the other thereof. For example, a laminated body such as an organic multilayered film, an inorganic multilayered film, or a liquid crystal multilayered film can be used as the reflection type polarizer.

Second Configuration Example

Figure 5B:
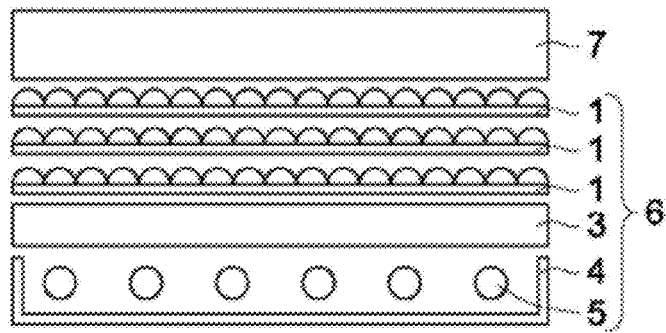

FIG. 5B is a schematic view illustrating a second configuration example of a liquid crystal display apparatus according to the second embodiment. As illustrated in FIG. 5B, the backlight 6 includes the diffusion plate 3 and three diffusion sheets 1. The diffusion plate 3 and the three diffusion sheets 1 are arranged in this order from the light sources 5 toward the liquid crystal panel 7.

In the second configuration example, configurations other than the above configuration are the same as those in the first configuration example.

Third Configuration Example

Figure 5C:
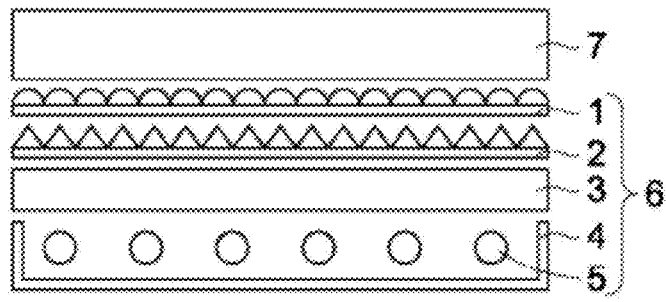

FIG. 5C is a schematic view illustrating a third configuration example of a liquid crystal display apparatus according to the second embodiment. As illustrated in FIG. 5C, the backlight 6 includes the diffusion plate 3, the lens sheet 2, and the diffusion sheet 1. The diffusion plate 3, the lens sheet 2, and the diffusion sheet 1 are arranged in this order from the light sources 5 toward the liquid crystal panel 7.

In the third configuration example, configurations other than the above configuration are the same as those in the first configuration example.

According to this embodiment, since the backlight 6 includes the diffusion sheet(s) 1 according to the first embodiment, brightness of the liquid crystal display apparatus can be improved while effectively improving unevenness in the brightness of the light sources 5. Further, the lens sheet 2 can be replaced by the diffusion sheet 1.

Hereinbefore, the embodiments of the present embodiment have been described. However, the present embodiment is not limited to the embodiments and various modifications can be made based on a technical spirit of the present embodiment.

Figure 18A:
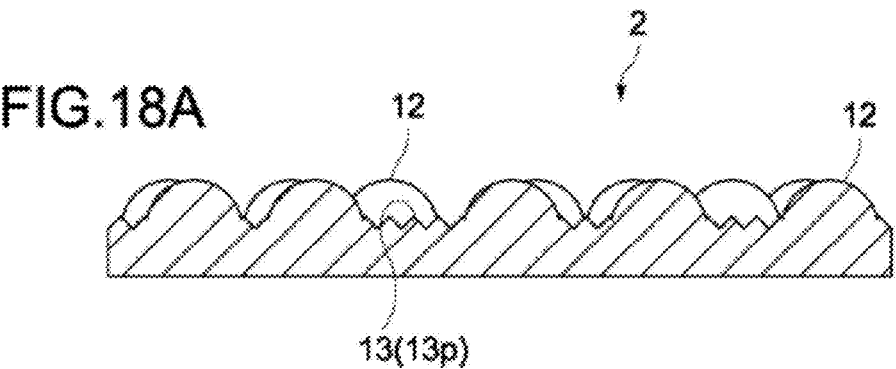
FIG. 18A is a cross-sectional view schematically illustrating a main part of a modification of the diffusion sheet according to an embodiment and FIG. 18B is a perspective view thereof.
Figure 18B:
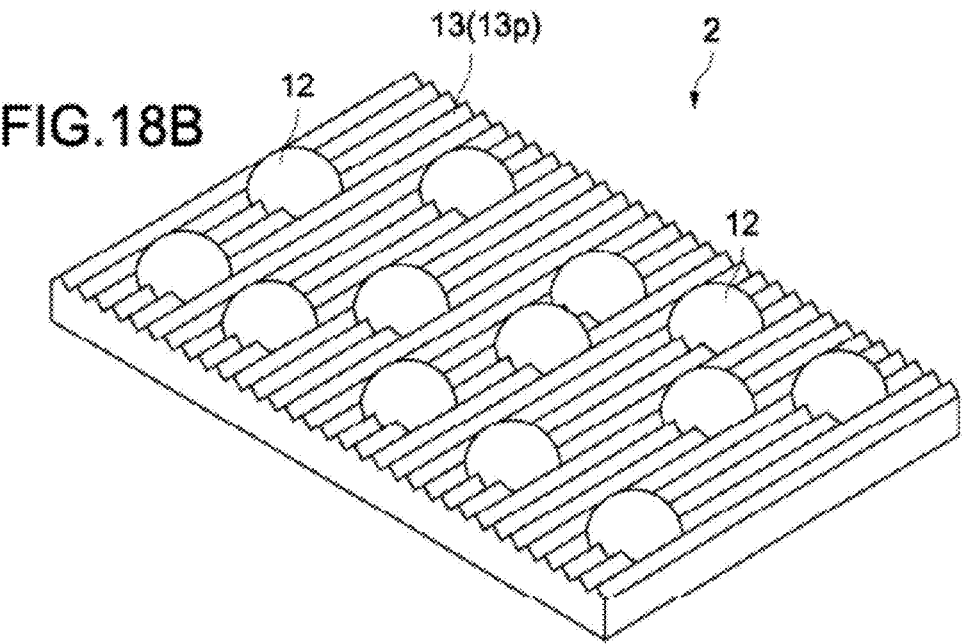

For example, in the above embodiments, the blast processing is used for processing of roughening a master plate for producing a diffusion sheet. However, processing of roughening the master plate may be performed by using various types of surface processing methods such as wire blushing processing, laser processing, and grinding processing instead of the blast processing. The flattened portion 13 is defined by the surface roughness (Ra) thereof regardless of the processing methods. The processing shape thereof is not particularly limited and may be any shapes including a spherical shape, a prism shape, a grid shape, and the like. For example, FIGS. 18A and 18B are respectively a cross-sectional side view and a perspective view schematically illustrating a main part of a diffusion sheet 2 on which prisms 13p each having a substantially triangular cross section are formed on a surface of a flattened portion 13. A light diffusion effect on the flattened portion can be obtained by forming the flattened portion 13 into a prism form. Further, a surface roughness of the flattened portion 13 at this time may be different between the ridge line direction and the arrangement direction of the prisms 13p.

However, it is sufficient that at least one of both the directions has a surface roughness (Ra) equal to or lower than 0.6 μm.

Figure 19:
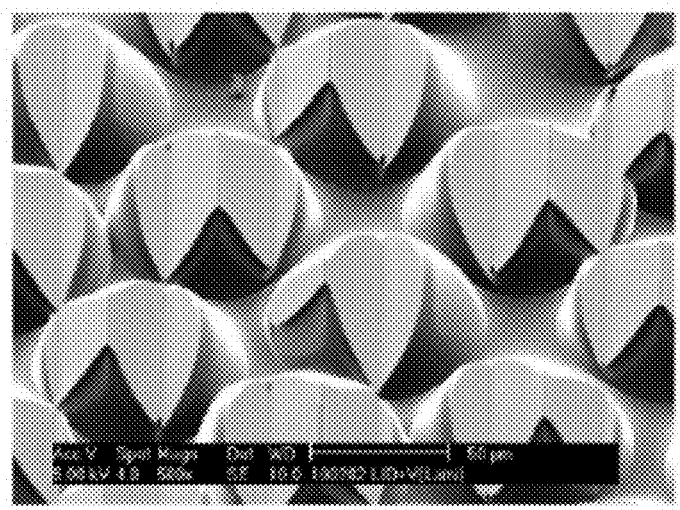
FIG. 19 is an electron microscopic picture illustrating a modification of the diffusion sheet according to an embodiment.

It is sufficient that the surface roughness (Ra) of the structures 12 is lower than that of the flattened portion 13. For example, the surface roughness (Ra) of the structures 12 is equal to or lower than 0.2 μm. Further, the structures 12 are not limited to those each having the partial spherical shape. For example, FIG. 19 illustrates an example of the structures 12 obtained by forming structures each having the partial spherical shape, and then, forming fine trenches on the surfaces of the structures. With this, structures having light diffusing effects on the spherical surface portions and light collecting functions on the trench portions can be formed.

A method of molding the diffusion sheet is not limited to methods by using the above melt extrusion molding apparatus and laminate transfer molding apparatus. For example, other molding apparatuses such as a heat pressing apparatus may be used.

Further, configurations, methods, shapes, materials, numerical values, and the like as described in the above embodiments are merely examples. Therefore, configurations, methods, shapes, materials, numerical values, and the like different from those may be used if needed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A diffusion sheet, comprising:
a light-transmissive base member having a first main surface and a second main surface that is opposed to the first main surface;
a plurality of structures having convex shapes, which are irregularly spaced and aligned relative to one another on the first main surface; and
a flattened portion which is formed among the plurality of structures on the first main surface and has a surface roughness (Ra) equal to or lower than 0.6 μm,
wherein the second main surface has a surface roughness (Ra) equal to or lower than 0.5 μm, and
wherein the structures have a partial hemispherical shape that is smaller than a hemisphere.

2. The diffusion sheet according to claim 1, wherein
the flattened portion has a surface roughness (Ra) equal to or larger than 0.2 μm and equal to or lower than 0.6 μm.

3. The diffusion sheet according to claim 2, wherein
the plurality of structures have a filling rate equal to or higher than 60% and equal to or lower than 80% with respect to the first main surface.

* * * * *